United States Patent [19]

Nakase et al.

[11] 4,240,254
[45] Dec. 23, 1980

[54] EXHAUST GAS PURIFYING APPARATUS FOR MULTICYLINDER INTERNAL COMBUSTION ENGINES

[75] Inventors: Takamichi Nakase, Gamagori; Tadashi Hattori, Okazaki; Junichiro Naito, Toyokawa; Kenji Kondo, Aichi, all of Japan

[73] Assignee: Nippon Soken, Inc., Nishio, Japan

[21] Appl. No.: 894,432

[22] Filed: Apr. 7, 1978

Related U.S. Application Data

[63] Continuation-in-part of Ser. No. 863,579, Dec. 22, 1977.

[30] Foreign Application Priority Data

| Dec. 26, 1976 [JP] | Japan | 51/157284 |
| Feb. 28, 1977 [JP] | Japan | 52/21084 |
| Mar. 18, 1977 [JP] | Japan | 52/30855 |
| Apr. 11, 1977 [JP] | Japan | 52/41235 |
| Oct. 12, 1977 [JP] | Japan | 52/122000 |

[51] Int. Cl.³ .............................................. F01N 3/15
[52] U.S. Cl. .................................... 60/293; 60/299
[58] Field of Search ............... 60/276, 289, 290, 293, 60/299

[56] References Cited

U.S. PATENT DOCUMENTS

| 2,854,816 | 10/1958 | Bodine | 60/293 |
| 4,024,706 | 5/1977 | Adawi | 60/274 |
| 4,069,666 | 1/1978 | Nakamura | 60/293 |
| 4,087,964 | 5/1978 | Miyagi | 60/276 |
| 4,127,088 | 11/1978 | Ezoe | 60/276 |

FOREIGN PATENT DOCUMENTS

| 968970 | 6/1975 | Canada | 60/299 |
| 2632881 | 2/1977 | Fed. Rep. of Germany | 60/293 |

*Primary Examiner*—Douglas Hart
*Attorney, Agent, or Firm*—Cushman, Darby & Cushman

[57] ABSTRACT

An exhaust gas purifying apparatus having an exhaust pipe divided into at least two branches each connected to a different cylinder or cylinders. Each of the exhaust pipe branches is further connected to a secondary air supply tube to intermittently supply secondary air upstream of a three-way catalyst disposed in the branch thereby to vary periodically within a range the air-fuel ratio of exahust gases flowing into the three-way catalyst.

1 Claim, 7 Drawing Figures

EXHAUST GAS PURIFYING APPARATUS FOR MULTICYLINDER INTERNAL COMBUSTION ENGINES

CROSS REFERENCE TO RELATED APPLICATIONS

This application is a continuation-in-part application of Ser. No. 863,579 filed Dec. 22, 1977 now pending.

BACKGROUND OF THE INVENTION

The present invention relates to exhaust gas purifying apparatus for multicylinder internal combustion engines, and more particularly the invention relates to an exhaust gas purifying apparatus of the type including exhaust gas reactors each having a three-way catalyst and a secondary air supply system.

DESCRIPTION OF THE PRIOR ART

Figure 1:
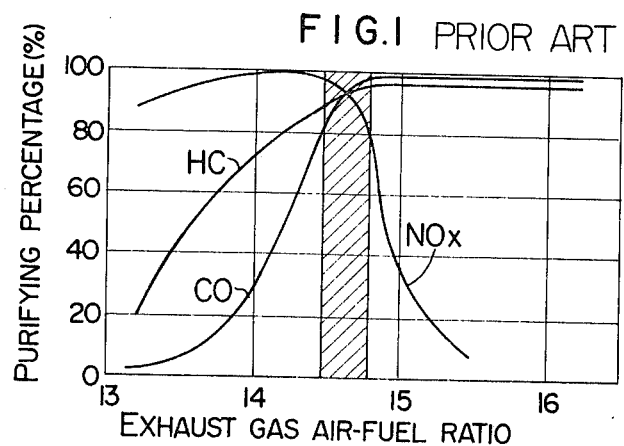
FIG. 1 is a characteristic diagram showing the purifying percentages of a three-way catalyst under ordinary working conditions.

Generally, a so-called three-way catalyst employing the same catalytic bed as a medium for oxidizing carbon monoxide (CO) and hydrocarbons (HC) and reducing nitrogen oxides ($NO_x$) in exhaust gases to remove these noxious constituents, exhibits under ordinary working conditions a purifying efficiency as shown in FIG. 1 in relation to the air-fuel ratios of exhaust gases. Consequently, in order to operate the three-way catalyst within the range of high purification percentages, the air-fuel ratio of exhaust gases must be maintained within the hatched region shown in FIG. 1. With ordinary internal combustion engines, however, it is extremely difficult to maintain the air-fuel ratio of exhaust gases within such a limited range throughout the range of engine operating conditions. A method of widening the air-fuel ratios over which a three-way catalyst having an oxygen storage capacity is operative is known in U.S. Pat. No. 4,024,706 issued May 24, 1977. On the other hand, a system has been proposed in which an air-fuel ratio detector detects the oxygen content of exhaust gases which varies in accordance with the operating conditions of an engine so as to feedback control the air-fuel ratio of exhaust gases to maintain the same at the optimum ratio, and this system also has the disadvantage of being complicated in system construction.

SUMMARY OF THE INVENTION

It is therefore the object of the present invention to provide an exhaust gas purifying apparatus which overcomes the foregoing deficiencies in the prior art to allow its three-way catalysts to display a high purifying efficiency within a relatively wide range of air-fuel ratios and thereby to ensure positive purification of exhaust gases with a simple construction.

Figure 2:
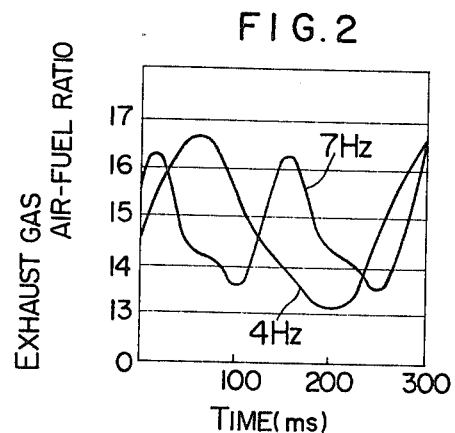
FIG. 2 is a graph showing the variations in the air-fuel ratio of exhaust gases.

In accordance with the present invention, this object is accomplished by causing the air-fuel ratio of exhaust gases flowing into the three-way catalysts to substantially vary periodically as shown in FIG. 2. Thus, a first feature of the present invention resides in supplying secondary air to an exhaust passage upstream of each three-way catalyst so as to utilize variations in the pressure of exhaust gases in the exhaust passage and thereby periodically switching on and off the supply of secondary air or periodically varying the amount of secondary air supplied.

Figure 3:
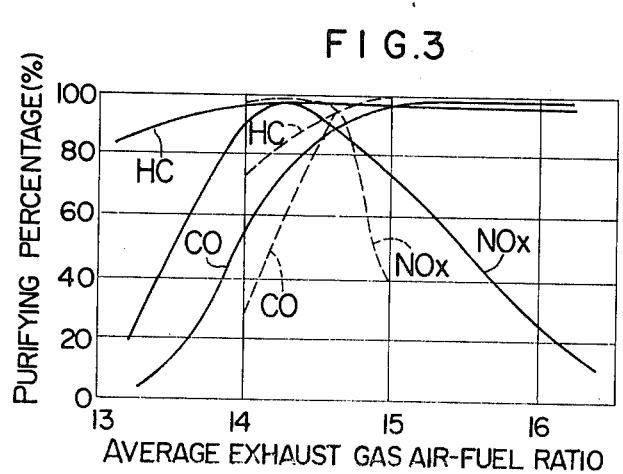
FIG. 3 is a characteristic diagram showing the relationship between the purifying percentage of a three-way catalyst and the variation in the air-fuel ratio of exhaust gases.

With the air-fuel ratio of exhaust gases being varied periodically in the above mentioned manner, when the exhaust gases flowing into the three-way catalyst have a large air-fuel ratio and consist of an oxidizing atmosphere, oxygen is adsorbed in the catalyst in a microscopic sense so that a reducing atmosphere is produced on the surface of the catalyst and the purifying efficiency of $NO_x$ is improved. Then, exhaust gases having a small air-fuel ratio and consisting of a reducing atmosphere flow into the catalyst so that an oxidation reaction occurs between the adsorbed oxygen and CO and HC and the purifying efficiency of CO and HC is improved. Thus, according to what has been confirmed by the inventors, as shown in FIG. 3, while the purifying percentage in relation to the average air-fuel ratio of exhaust gases decreases somewhat at the crossing point (the stoichiometric air fuel ratio of $\lambda=1$) of the curves for the three constituents of CO, HC and $NO_x$, the purifying percentage can be improved on the large (lean) and small (rich) sides as compared with the stoichiometric air-fuel ratio, thus increasing the range of air-fuel ratio which ensures high purifying percentages.

Figure 4:
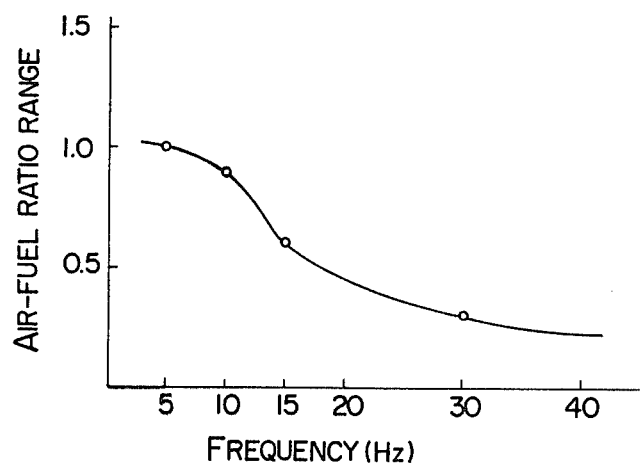
FIG. 4 is a graph showing the relationship between the frequency of variation in the exhaust gas air-fuel ratio and the purifying efficiency of the three-way catalyst.

On the other hand, where the air-fuel ratio of exhaust gases is varied by utilizing the pulsation of engine exhaust gases, if the exhaust gases from all the cylinders of the engine are directed to a single exhaust passage and fed to the three-way catalyst, the frequency of variation in the air-fuel ratio of exhaust gases becomes excessively high, particularly in the high engine speed range and consequently the variation is substantially smoothed out as the exhaust gases flow into the three-way catalyst. Thus, a second feature of this invention resides in the prevention of such occurrence by dividing the exhaust passage into at least two branch passages connected to different cylinders of the engine, supplying secondary air into each of the branch passages separately and arranging a three-way catalyst downstream of each of the branch passages. The effect of this arrangement is that the exhaust gases having an optimumly varying air-fuel ratio can be caused to flow into each three-way catalyst thus allowing each of the three-way catalysts to operate with a high purifying percentage within a wide range of air-fuel ratios. In addition, by decreasing the frequency of variation of the air-fuel ratio, the range (limits) of air-fuel ratios which ensures high purifying percentages can be increased further as shown in FIG. 4, thus ensuring the desired purification of exhaust gases with a simple construction.

DESCRIPTION OF THE PREFERRED EMBODIMENTS

The present invention will now be described in greater detail with reference to the illustrated embodiments.

Figure 5:
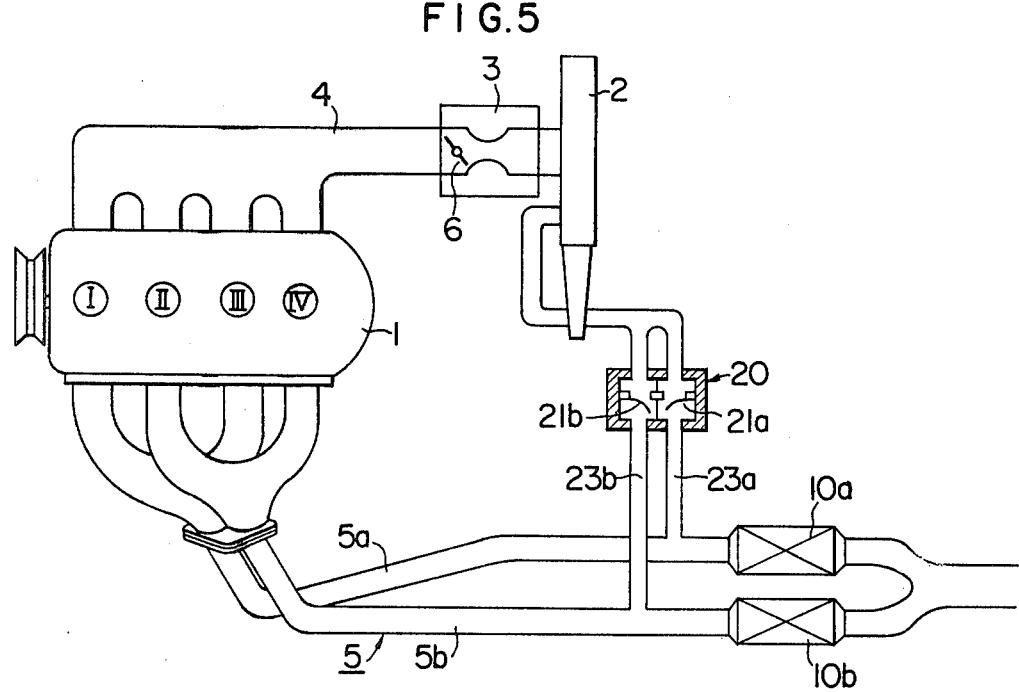
FIG. 5 is a schematic diagram showing an embodiment of the present invention.

Referring now to FIG. 5 showing an embodiment of the present invention which is incorporated in a four cylinder engine, numeral 1 designates an internal combustion engine, 2 an air cleaner, 3 a carburetor, 4 an intake pipe, and 5 an exhaust pipe. As is well known in the art, the carburetor 3 adjusts the amount of fuel supply, so that a controlled amount of air drawn through the air cleaner 2 and a throttle valve 6 is mixed with the proper amount of fuel and the resulting mixture is supplied to the engine 1 by way of the intake pipe 4. In this embodiment, the carburetor 3 is adjusted to produce a mixture which is slightly richer than the stoichiometric air-fuel ratio. The engine 1 is designed so that the rich mixture is burned in the respective cylinders in a predetermined firing order, so that after the completion of the burning, the burned mixture is discharged as exhaust gases into the exhaust pipe 5 which in turn discharges the exhaust gases to the atmosphere. The firing order of the engine 1 is in the order of the first cylinder I, the third cylinder III, the fourth cylinder IV and the second cylinder II.

In accordance with the present invention, the exhaust pipe 5 constituting an exhaust passage is divided into branch passages 5a and 5b, of which the branch passage 5a is connected to the first and third cylinders I and III which are fired successively and the other branch passage 5b is connected to the remaining second and fourth cylinders II and IV which are also fired successively. Exhaust gas reactors 10a and 10b each having a three-way catalyst with oxygen storage material are respectively disposed in the branch passages 5a and 5b, and secondary air supply pipes 23a and 23b are opened to the branch passages 5a and 5b upstream of the reactors 10a and 10b, respectively. The exhaust passages are joined together at a point downstream of the exhaust gas reactors 10a and 10b.

As is well known in the art, the three-way catalyst constituting each exhaust gas reactor facilitates the oxidation and reduction of CO, HC and $NO_x$ in the exhaust gases flowing thereinto and it purifies these harmful components with the purification percentages shown in FIG. 1. In particular, by supplying secondary air in a pulse-like manner to the exhaust system before the three-way catalysts so as to cause the air-fuel ratio of exhaust gases flowing into the three-way catalysts to vary like a pulse wave, according to the experiments conducted by the inventors, the purifying efficiency shown in FIG. 3 can be obtained with the resulting increase in the range of air-fuel ratios which ensures high purifying percentages. Also, in this case, as shown in FIG. 4 this range of air-fuel ratios can be increased with the resulting increase in the purifying efficiency as the frequency of variation in the air-fuel ratio is decreased.

Connected to the secondary air supply lines 23a and 23b is an air suction valve 20 having reed valve members 21a and 21b which are operable independently of each other whereby in response to the pulsation of the exhaust gases in the branch passages 5a and 5b, secondary air is supplied in a pulse-like manner from the supply lines 23a and 23b independently of each other.

Figure 6:
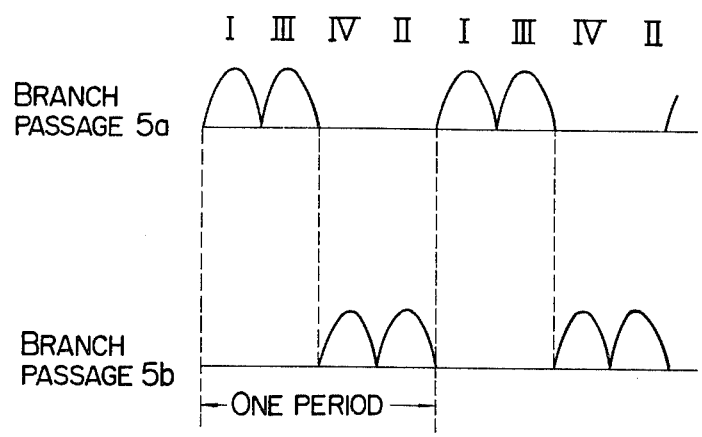
FIG. 6 is a diagram for explaining the principle of operation of the apparatus shown in FIG. 5.

With the construction described above, when the mixture is burned successively in the cylinders of the engine 1 and the resulting exhaust gases are discharged to the exhaust pipe 5, the exhaust gases are correspondingly pulsated in the exhaust pipe 5. As is known in the art, pressure pulsations of an exhaust gas are generated in an exhaust pipe in a particular manner. When an exhaust port is opened, a positive pressure wave travels down the pipe. At the open end of the pipe, the wave is reflected back towards the port as a negative pressure wave. On reaching the now-closed port, the negative pressure wave is reflected, without inversion, towards the open end of the pipe where it is inverted and reflected as a positive pressure wave. As the process is repeated, pressure pulsations in the form of reflected positive and negative pressure waves are generated. With the exhaust pipe 5 divided into the branch passages 5a and 5b as mentioned previously, the exhaust gases flowing in the branch passages 5a and 5b pulsate as schematically shown in FIG. 6. By virtue of the negative pressure due to the pulsation of the exhaust gases, secondary air is supplied through the air suction valve 20 into the branch passages 5a and 5b from the associated secondary air supply lines 23a and 23b. In the case of the engine speeds of 600 rpm and 1,800 rpm, respectively, considering the cylinders of a four cylinder, four cycle engine as a whole, the resulting frequencies of pulsation of the exhaust gases become 20 Hz and 60 Hz, respectively. In the branch passages 5a and 5b, however, considering the succeeding two peaks as a single pulsation in FIG. 6, the resulting frequency of the pulsations become 5 Hz and 15 Hz, respectively, and the supply frequencies of the secondary air supplied periodically in response to the pulsation frequencies also become 5 Hz and 15 Hz, respectively. Since the secondary air supplied dilutes the exhaust gases, the air-fuel ratio of the exhaust gases flowing into the three-way catalysts 10a and 10b is repeatedly varied periodically with a low variation frequency as shown in FIG. 2 and thus a satisfactory variation of the air-fuel ratio is ensured even in the high speed range of the engine.

By thus periodically varying the air-fuel ratio of exhaust gases, an oxygen adsorbing phenomena occurs in the catalyst when the exhaust gases having a large air-fuel ratio and forming an oxidizing atmosphere flow into the three-way catalysts 10a and 10b, respectively, thus increasing the purification efficiency of $NO_x$. When the exhaust gases having a small air-fuel ratio and forming a reducing atmosphere flow thereafter into each three-way catalyst, an oxidation reaction is caused between the adsorbed oxygen and HC and CO thus increasing the purification efficiency of CO and HC. As a result, the purification percentages shown in FIG. 3 can be obtained as mentioned previously thus increasing the range of air-fuel ratios which ensures high purification percentages as compared with those (shown by the hatched lines) obtained under the conventionally used ordinary working conditions.

Moreover, as mentioned previously, the range of air-fuel ratios which ensures high purification percentages increases with decrease in the frequency of variation in the air-fuel ratio as shown in FIG. 4. In the case of FIG. 4, the air-fuel ratio of exhaust gases was varied between 13.5:1 and 15.5:1, and the range of air-fuel ratios capable of ensuring purification percentages of over 60% with respect to all of CO, HC and $NO_x$ was measured at the engine speed of 2,000 rpm.

Thus, with the above-described exhaust gas purifying apparatus, the air-fuel ratio of exhaust gases needs not be maintained constant exactly, and the desired purification of exhaust gases can be ensured with a simple construction. It is desirable to arrange the three-way catalysts 10a and 10b and the secondary air supply lines 23a and 22b as close to the engine 1 as possible, since this improves the above-mentioned effect.

Figure 7:
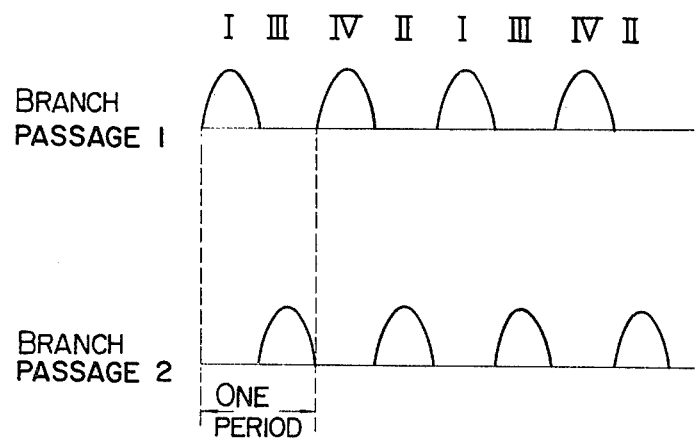
FIG. 7 is a diagram for explaining the principle of operation of another embodiment of the invention.

While, in the embodiment described above, each pair of continuously fired cylinders is formed into a group when dividing the exhaust passage into two branch passages, in accordance with the present invention, it is possible to form the first and fourth cylinders which are fired alternately into one group and the other alternately fired second and third cylinders into the other group in the case of a four cylinder engine. In this case, the pulsation of the exhaust gases in each of the branch passages becomes as shown in FIG. 7, so that while the resulting frequency of pulsation is two times that obtained in the embodiment shown in FIG. 5 with a slight decrease in the resulting effect, the effect is still much superior to that of the prior art apparatus. With the present invention, if some increase in the cost is allowable, it is of course possible to divide the exhaust passage into as many branch passages as there are cylinders in the engine, dispose a three-way catalyst in each of the branch passages and supply secondary air to each three-way catalyst.

Further, while, in the embodiment described above, the secondary air supply system is of the type which sucks secondary air by utilizing the pulsation of exhaust gases to thereby satisfactorily vary the air-fuel ratio of exhaust gases, in accordance with the present invention the secondary air supply system may be of the type including an air pump driven from the engine. In this case, while secondary air is always supplied to all the branch passages, the exhaust gases are also pulsated periodically in each of the branch passages so that the amount of secondary air supplied is varied in response to the pulsation and the air-fuel ratio of the exhaust gases is varied in a pulse-like manner.

Still further, in accordance with the present invention, in addition to controlling the supply of secondary air by utilizing the pulsation of exhaust gases, the supply of secondary air may be forcibly switched on and off periodically by valve means disposed in the supply passages to thereby ensure improved effect.

Still further, in accordance with the above-mentioned concept of the four cylinder engine, the present invention may also be applied to any other multicylinder engine, such as, four cylinder engine, eight cylinder engine or the like.

In the present specification, the term "exhaust gas air-fuel ratio" means the air-fuel ratio of the mixture which is not yet burned and which after burning will be discharged as exhaust gases, and in cases where secondary air is supplied the term means the air-fuel ratio obtained on the assumption that the pre-burning mixture has been mixed with secondary air. In other words, the air-fuel ratio represents the value obtained by calculating the composition of exhaust gases in terms of the air-fuel ratio of a pre-burning mixture.

We claim:

1. An exhaust gas purifying apparatus for a multi-cylinder internal combustion engine, comprising:

first and second exhaust pipes disposed to discharge burned gases from said cylinders to the atmosphere;

means for connecting to said first exhaust pipe a first set of cylinders which comprise a plurality of cylinders which are successively fired in the firing order of the engine;

means for connecting to said second exhaust pipe a second set of cylinders which comprise a further plurality of cylinders which are successively fired in the firing order of the engine;

a first and a second three-way catalyst respectively disposed in said first and second exhaust pipes to purify exhaust gases;

first and second secondary air supply lines respectively opening to said first and second exhaust pipes upstream of said three-way catalysts therein to supply secondary air thereto; and first and second on-off means respectively disposed in said first and second supply lines to open and close the same for switching on and off the supply of secondary air to said first and second exhaust pipes, said first and second on-off means comprising air suction valves having reed valve members which are operable independently of each other in response to respective pulsations of the exhaust gas flow in said first and second exhaust pipes, caused respectively by successive combustions in said first and second sets of cylinders, to thereby supply the secondary air in a pulse-like manner and cause the air-fuel ratio of exhaust gases therein to vary above and below a stoichiometric air-fuel ratio.

* * * * *